US005435812A

United States Patent [19]
Abramo et al.

[11] Patent Number: 5,435,812
[45] Date of Patent: Jul. 25, 1995

[54] MODIFIED SUCCINIMIDES AS DISPERSANTS AND DETERGENTS AND LUBRICANT AND FUEL COMPOSITIONS CONTAINING SAME

[75] Inventors: Guy P. Abramo, Herndon, Va.; David A. Blain, Mount Laurel; Angeline B. Cardis, Florence, both of N.J.

[73] Assignee: Mobil Oil Corporation, Fairfax, Va.

[21] Appl. No.: 912,369

[22] Filed: Jul. 19, 1992

Related U.S. Application Data

[63] Continuation-in-part of Ser. No. 540,722, Jun. 21, 1990, abandoned.

[51] Int. Cl.$^6$ ............... C10L 1/18; C10L 1/22
[52] U.S. Cl. .................. 44/331; 44/347; 548/520
[58] Field of Search .............. 44/331, 347; 548/520, 548/546

[56] References Cited

U.S. PATENT DOCUMENTS

| | | | |
|---|---|---|---|
| 4,501,597 | 2/1985 | Karol et al. | 44/347 |
| 4,631,070 | 12/1986 | Plavac | 44/347 |
| 4,666,459 | 5/1987 | Wollenberg | 44/347 |
| 4,798,612 | 1/1989 | Plavac et al. | 44/346 |
| 4,948,386 | 8/1990 | Sung et al. | 44/329 |
| 5,030,249 | 7/1991 | Herbstman et al. | 44/347 |
| 5,069,684 | 12/1991 | Blain et al. | 44/331 |
| 5,160,649 | 11/1992 | Cardis et al. | 252/51.5 A |
| 5,169,409 | 12/1992 | Blain et al. | 252/51.1 A |

*Primary Examiner*—Jacqueline V. Howard
*Attorney, Agent, or Firm*—Alexander J. McKillop; Malcolm D. Keen; Charles A. Malone

[57] ABSTRACT

Reaction products, in which aromatic acid bis(polyether ester) is added to succinimides, are effective antioxidants, dispersants, and detergents for fuels and lubricants.

14 Claims, No Drawings

MODIFIED SUCCINIMIDES AS DISPERSANTS AND DETERGENTS AND LUBRICANT AND FUEL COMPOSITIONS CONTAINING SAME

CROSS REFERENCE TO RELATED APPLICATIONS

This application is a continuation-in-part of application Ser. No. 07/540,722, filed Jun. 21, 1990, now abandoned.

BACKGROUND OF THE INVENTION

This application is directed to reaction products in which aromatic acid bis(polyether ester) when added to succinimides have been found to be effective antioxidants, ashless dispersants, and detergents for fuels and lubricants. The instant products are made by reacting aromatic acid bis(polyether ester) with alkyl or alkenyl succinimides to form polyether substituted alkyl or alkenyl succinimides Alkyl and alkenyl substituted succinimides are known in the art as detergents and dispersants for lubricants and fuels. Post reaction of these succinimides to incorporate other functionality is also known (U.S. Pat. Nos. 4,666,460; 4,636,322,; 4,713,191; and 4,747,964 are among the many recent examples.) None of these, however, contain polyethers.

Products containing both polyether (also known as polyoxyalkylene) and polyamine fragments are known as dispersants as disclosed in U.S. Pat. Nos. 4,234,321; 4,261,704; 4,720,350 and 4,737,160. These dispersants do not include alkyl or alkenyl succinimides, however.

It is believed that the use of aromatic acid bis(polyether ester) modified succinimides as fuel and lubricant additives is novel. The resulting combination of ester, amide and imide functionalities contribute to the dispersancy and detergency of these new materials. Accordingly, an object of this invention is to provide improved antioxidant, detergent and dispersant additives for fuels and lubricants.

SUMMARY OF THE INVENTION

In accordance with the invention modified succinimides are prepared by reacting an alkyl or alkenyl substituted succinimide with an aromatic acid bis(polyether ester). In one aspect the invention comprises lubricant and fuel compositions containing minor amounts of the modified succinimides as effective antioxidants, ashless dispersants, and detergents for said compositions.

DESCRIPTION OF THE SPECIFIC EMBODIMENTS

Aromatic acid bis(polyether ester) is reacted with alkyl or alkenyl substituted mono- or bis-succinimides to give products that may include, but are not limited to, the following generalized structure:

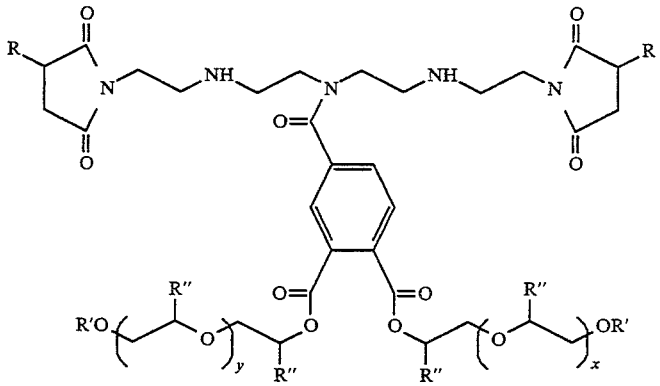

From 1 to y equivalents of aromatic acid bis(polyether ester) are added per equivalent of succinimide, were y is the number of basic nitrogens present. R can be an alkyl or alkenyl group from $C_6$ to $C_{100}$, with polyisobutene being the preferred substituent. R' can be hydrogen, alkyl, aryl, alkaryl, or arylalkyl from $C_1$ to $C_{100}$, with $C_1$ to $C_{12}$ alkyl or alkyl substituted phenyls being the preferred substituents. R'' can be hydrogen, alkyl, aryl, alkaryl, or arylalkyl from $C_1$ to $C_{100}$, with $C_1$ to $C_{12}$ alkyl or alkyl substituted phenyls being the preferred substituents. X=5 to 100. The polyamine is not limited to tetraethylene pentamine, but can be other poly(ethyleneamines) such as diethylene triamine, triethylene tetramine, and pentaethylene hexamine. The polyamine can also include poly(propyleneamines) and poly(butyleneamines), and mixtures thereof.

Any suitable aromatic acid bis(polyether ester) may be used herein. Especially preferred are those derived from aromatic tricarboxylic acids such as 1,2,4-benzenetricarboxylic(trimellitic) acid, 2,5,7-naphthalene tricarboxylic acid, 1,2,4-naphthalene tricarboxylic acid or acid anhydrides of the aforementioned acids and two equivalents of a polyether.

Reaction conditions are not believed to be critical. Usually, however, the aromatic acid bis(polyether ester) and the succinimides are added in equimolar amounts although less than molar or more than molar amounts may be used. The reaction temperature, pressure and times may vary widely. Temperatures may vary from about 85° to about 225° C. The pressure may be autogenous or vary from atmospheric or ambient to slightly higher, about 100 psi. The reaction times may vary from about one hour to about 24 hours or more. A solvent may or may not be used. Any suitable hydrocarbon solvent such as xylene or mixed xylenes may be used.

The molecular weight of the succinimide may advantageously vary from about 300 to about 5,000.

In preparing a fuel composition the additive is added at a rate of between 25 and 500 pounds of additive per 1,000 barrels of fuel. The liquid fuel can be a liquid hydrocarbon fuel or an oxygenated fuel or mixtures thereof. Liquid hydrocarbon fuels include gasoline, fuel oils, diesel oils, and oxgenated fuels including methyl and ethyl alcohols and ethers.

It is to be understood that the liquid fuel compositions described herein can also contain other materials. For example, corrosion inhibitors, co-antioxidants, and the like can be used.

In preparing a lubricant composition the additive is added to the base lubricating oil stock in a concentration of between 0.1 and 10 percent by weight of the total composition. In general, the mineral oils, both paraffinic, naphthenic and mixtures thereof, employed as a lubricating oil or as the grease vehicle, can be of any suitable lubricating viscosity range, as for example, from about 45 SUS at 100° F. to about 6,000 SUS at 100° F., and preferably from about 50 to about 250 SUS at 210° F. These oils may have viscosity indexes ranging to 100 or higher. Viscosity indexes from about 70 to about 95 are preferred. The average molecular weights of these oils can range from about 250 to about 800.

Where the lubricant is employed as a grease, the lubricating oil is generally used in an amount sufficient to balance the total grease composition, after accounting for the desired quantity of the thickening agent, and other additive components included in the grease formulation. A wide variety of materials can be employed as thickening or gelling agents. These can include any of the conventional metal salts or soaps, such as calcium, or lithium stearates or hydroxystearates, which are dispersed in the lubricating vehicle in grease-forming quantities in an amount to impart to the resulting grease composition the desired consistency. Other thickening agents that can be employed in the grease formulation comprise the non-soap thickeners, such as surface-modified clays and silicas, aryl ureas, calcium complexes and similar materials. In general, grease thickeners can be employed which do not melt and dissolve when used at the required temperature within a particular environment; however, in all other respects, any material which is normally employed for thickening or gelling hydrocarbon fluids for forming grease can be used in preparing the aforementioned improved grease in accordance with the present invention.

In instances where synthetic oils, or synthetic oils employed as the vehicle for the grease, are desired in preference to mineral oils, or in preference to mixtures of mineral and synthetic oils, various synthetic oils may be utilized successfully. Typical synthetic oil vehicles include polyisobutylenes, polybutenes, hydrogenated polydecenes, polypropylene glycol, polyethylene glycol, trimethylol propane esters, neopentyl and pentaerythritol esters, di(2-ethylhexyl) sebacate, di(2-ethylhexyl) adipate, dibutyl phthalate, fluorocarbons, silicate esters, silanes, esters of phosphorus-containing acids, liquid ureas, ferrocene derivatives, hydrogenated synthetic oils, chain-type polyphenyls, siloxanes and silicones (polysiloxanes) and alkyl-substituted diphenyl ethers typified by a butyl-substituted bis(p-phenoxy phenyl) ether, and phenoxy phenylethers, and alkylated aromatics such as alkylated benzenes and alkylated naphthalenes.

It is to be understood that the lubricating fluid or grease compositions described herein can also contain other materials, e.g., corrosion inhibitors, extreme pressure agents, viscosity index improvers, antioxidants, antiwear agents and the like can be used. These include, but are not limited to, phenates, sulfonates, succinimides, zinc dialkyl or diaryl dithiophosphates, and the like.

EXAMPLE 1

Trimellitic anhydride (0.5 mole, 96.0 g), butanol-initiated polybutylene oxide (1.0 mole, 521 g), p-toluenesulfonic acid (0.01 mole, 1.9 g) and 200 ml of xylenes were charged to a 2 L 4-necked reactor equipped with an overhead stirrer, thermometer, Dean Stark trap, and $N_2$ purge. The reaction mixture was heated to reflux and was kept at this temperature (155° C.) for 24 hours. During this time, 8.5 ml of water collected in the Dean Stark trap. The resulting solution was stripped using rotary evaporation, first with house vacuum and finally with a vacuum pump. The product was cooled in an ice bath and filtered through a pad of celite filter aid. The resulting clear, brown liquid was titrated with 0.1N KOH and was found to have a combining weight of 1113.

EXAMPLE 2

The procedure from Example 1 was followed with the following exception: 983 MW polybutylene oxide was used in place of the 521 MW polybutylene oxide.

EXAMPLE 3

The product from Example 1 (0.03 mole, 33.4 g), a polyisobutenyl succinimide (0.03 mole, 87.6 g made by reacting 920 MW polyisobutylene and maleic anhydride, followed by one half equivalent of tetraethylene pentamine), and 100 ml xylenes were charged to a 500 ml 4-necked round bottom flask equipped with an overhead stirrer, thermometer, Dean Stark trap, and $N_2$ purge. The reaction was heated to reflux and was refluxed for three hours at 145° C. The temperature was then raised to 170° C. by removing solvent through the Dean Stark trap and was kept at this temperature for ca. 30 minutes. The resulting product was filtered through a bed of celite. Amide, ester, and succinimide bands were detected by IR spectroscopy.

EXAMPLE 4

The procedure from Example 3 was followed with the following exception: The product from Example 2 was substituted for the product from Example 1.

Evaluation of Product

Example 3 was evaluated in the B10 Oxidation Test described below.

B-10 CATALYTIC OXIDATION TEST

Basically, the test lubricant is subjected to a stream of air which is bubbled through at the rate of five liters per hour respectively at 325° F. for 40 hours and/or at 375° F. for 24 hours. Present in the composition are samples of metals commonly used in engine construction, namely, iron, copper, aluminum, and lead. See U.S. Pat. No. 3,682,980, incorporated herein by reference, for further details of the test.

The Table below shows the antioxidant capabilities of these multifunctional additives at a 1% level in a solvent paraffinic neutral base oil.

TABLE

| B-10 CATALYTIC OXIDATION TEST 325° F. 40 Hours | | | |
|---|---|---|---|
| Additive | % ΔKV | ΔTAN | Lead Loss |
| None | 245 | 19.0 | 120 |
| Example 3 | 54 | 3.6 | 4 |

We claim:

1. A reaction product obtained by reacting an aromatic acid bis(polyether ester) with a substituted succinimide wherein the reactants are reacted in equimolar, less than molar or more than molar amounts, at temperatures of from about 85° to 225° C. where the pressure is autogenous or varies from ambient to about 100 psi for times varying from 1 to about 24 hours or more.

2. The product of claim 1 wherein the substituted succinimide is an alkyl or alkenyl substituted succinimide.

3. The product of claim 2 wherein the aromatic acid bis(polyether ester) is derived from a tricarboxylic acid, anhydride or derivative thereof selected from the group consisting of 1,2,4-benzene tricarboxylic acid, 2,5,7-naphthalene tricarboxylic acid, 1,2,4-naphthalene tricarboxylic acid or anhydrides or derivatives thereof, and two equivalents of a polyether.

4. The product of claim 2 wherein the substituted succinimide is a $C_6$ to about a $C_{100}$ alkyl or alkenyl succinimide.

5. The product of claim 4 wherein the succinimide is a polyisobutenylsuccinimide.

6. The product of claim 5 wherein the molecular weight of said polybutenyl succinimide varies from about 300 to about 5,000.

7. The product of claim 2 which include at least one generalized structure as described below:

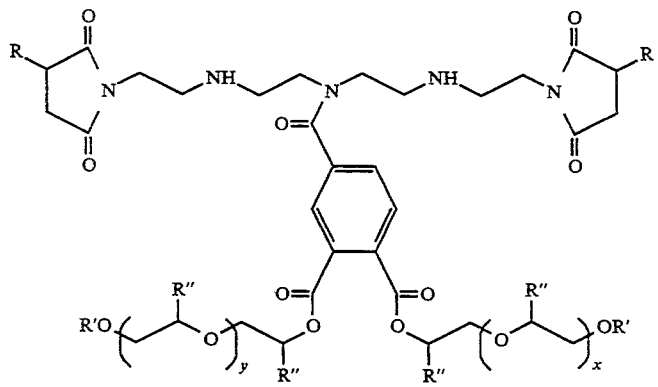

wherein R is $C_6$ to $C_{100}$ alkyl or alkenyl, R' is hydrogen or $C_1$ to $C_{100}$ alkyl, aryl, alkaryl or arylalkyl and R" is hydrogen or $C_1$ to $C_{100}$ alkyl, aryl, alkaryl or arylalkyl; $X = 5$ to 100.

8. A liquid fuel composition comprising a major amount of a fuel and between about 25 to about 500 pounds per 1,000 barrels of fuel of a reaction product obtained by reacting an aromatic acid bis(polyether ester) and a substituted succinimide in molar, less than molar or more than molar amounts at ambient to slightly higher pressures of about 100 psi and at temperatures of from about 85° to 225° C. for a time sufficient varying from about 1 hour to about 24 hours or more to obtain the desired polyether substituted tricarboxylic acid derivative modified succinimide.

9. The fuel composition of claim 8 wherein the aromatic acid bis(polyether ester) is derived from a tricarboxylic reactant selected from the group consisting of 1,2,4-benzene tricarboxylic acid, 2,5,7-naphthalene tricarboxylic acid, 1,2,4-naphthalene tricarboxylic acid or anhydrides or derivatives thereof, and two equivalents of a polyether.

10. The fuel composition of claim 8 wherein said succinimide is a polyisobutenyl succinimide.

11. The fuel composition of claim 10 wherein said succinimide has an average molecular weight varying from about 300 to about 5,000.

12. The fuel composition of claim 8 wherein said reaction product has at least one structure as generally described below:

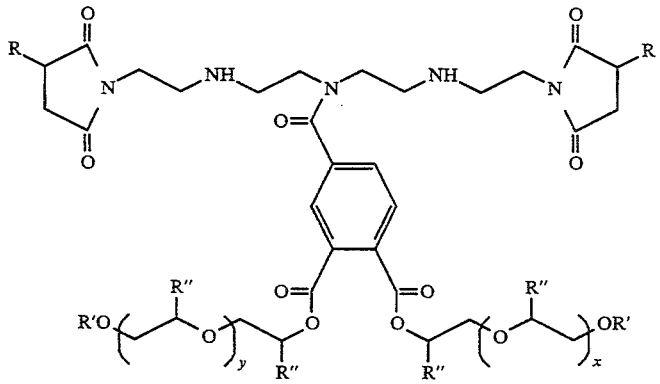

wherein R is $C_6$ to $C_{100}$ alkyl or alkenyl, R' is hydrogen or $C_1$ to $C_{100}$ alkyl, aryl, alkaryl or arylalkyl and R" is hydrogen or $C_1$ to $C_{100}$ alkyl, aryl, alkaryl or arylalkyl; $X = 5$ to 100.

13. The composition of claim 8 wherein said fuel is selected from liquid hydrocarbon fuels, oxygenated fuel or mixtures thereof.

14. The composition of claim 13 wherein said fuel is selected from gasolines, fuel oils, diesel oils, alcohol fuels and ethers or mixtures thereof.

* * * * *